(12) United States Patent
Dupont (10) Patent No.: US 7,228,599 B2
(45) Date of Patent: Jun. 12, 2007

(54) CORD TERMINATION AND ADJUSTABLE CLASPING MECHANISM

(75) Inventor: Anthony J. Dupont, Boise, ID (US)

(73) Assignee: 10 DuPont LLC, Boise, ID (US)

( * ) Notice: Subject to any disclaimer, the term of this patent is extended or adjusted under 35 U.S.C. 154(b) by 18 days.

(21) Appl. No.: 11/209,070

(22) Filed: Aug. 22, 2005

(65) Prior Publication Data

US 2007/0039137 A1    Feb. 22, 2007

(51) Int. Cl.
*F16G 11/00* (2006.01)

(52) U.S. Cl. .................................. 24/115 N; 24/129 R (58) Field of Classification Search .............. 24/115 N, 24/131 C, 130, 129 R; 43/44.83, 42.36, 43/42.49; 403/211, 215, 206
See application file for complete search history.

(56) References Cited

U.S. PATENT DOCUMENTS 666,400 A * 1/1901 Tregoning ................ 24/129 R
703,236 A * 6/1902 Christ et al. ............... 24/129 R
828,765 A * 8/1906 Nilsson ........................ 24/130
2,174,192 A * 9/1939 Meighan .................... 24/129 R
2,547,469 A * 4/1951 Husson ...................... 24/129 R
4,117,574 A * 10/1978 Yoshida .................... 24/129 R

* cited by examiner

*Primary Examiner*—Robert J. Sandy
(74) *Attorney, Agent, or Firm*—John Wiley Horton (57) ABSTRACT

An adjustable fastening mechanism generally including an adjustable clasp and a cord. The adjustable clasp has an inlet end, a fastener end, and a center core therebetween. In the preferred embodiment the adjustable clasp has an inlet and a radial port which are connected by a conduit. The inlet end of the adjustable clasp is narrower than the fastener end of the adjustable clasp. A helical groove is provided on the exterior of the adjustable clasp and extends from the radial port to an exterior bore near the fastener end of the adjustable clasp. The exterior bore extends through the solid center core of the adjustable clasp and is substantially perpendicular to the center axis of the adjustable clasp and helical groove.

14 Claims, 12 Drawing Sheets

CORD TERMINATION AND ADJUSTABLE CLASPING MECHANISM

CROSS-REFERENCES TO RELATED APPLICATIONS

Not Applicable

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of cords or cables. More specifically, the present invention comprises a cord construction, a cord termination, and an adjustable clasp which can be used to attach a cord to another device.

2. Description of the Related Art

Various fastening mechanisms are known for attaching cords or cables to devices (Throughout this disclosure, the terms "cord" and "cable" are considered synonymous). Fastening mechanisms are particularly important when the cord supports a tensile load. Most fastening mechanisms are not adjustable and do not allow the user to easily vary the length of the cord. These fastening mechanisms are typically semi-permanent. Often the user can shorten the length of the cord by cutting the cord next to the fastener and reattaching the same fastener or a different fastener to the shortened cord. It is generally inadvisable if not impossible to lengthen the cord because conventional fastening mechanisms damage the portion of the cord at the location where the fastener is attached.

One example of applications where it is useful to have an adjustable fastening means is control cable applications. For purposes of illustration, a bicycle control cable, such as a control cable used for braking or shifting, will be considered. A complete control cable consists of the tensile carrying cable itself, a first terminating device on one end, and a second terminating device on the other end. Because the length of such cables often need to be adjusted, at least one of the two terminating devices will normally include an adjustment feature.

Bicycle control cables are typically composed of an inner steel cable which is wrapped in a protective and supportive outer sheath. Various fastening and actuating devices are customarily attached to the opposite ends of the inner steel cable. These can include combinations of crimps, ferrules, donuts, caps and other hardware. Such fastening devices are used to connect the inner steel cable to a braking handle (or shifting lever) on one end and to the braking mechanism (or shifting mechanism) on the other end. Generally, some piece of hardware is crimped on to both ends of the inner steel cable so that the cable can be fastened to these other devices.

Crimping is a semi-permanent method of attaching hardware to the inner steel cord. To remove the hardware, the steel inner cord must generally be cut beneath the crimp. If the user attaches the hardware too short to reach the device it is designed to actuate or if the user moves the actuating mechanism further from the device that is actuated, the user will often have to replace the control cable. Accordingly it would be desirable to have an adjustable fastening mechanism that can be attached without damaging the cord.

In recent years the traditional steel cable has been replaced by advanced synthetic fibers. These fibers, when compared to steel, are much smaller and slicker. Crimping does not work well for synthetics, since the crimping force required to grip such a slick surface will often damage the fibers. Synthetic fibers also have very little compressive stiffness. This fact means that a bundle of such fibers will tend to be loosely organized. It will not maintain a circular cross section when passed around a bend but will flatten instead—producing uneven load distribution across the cable's cross section. An integrated cable, termination, and clasp system should ideally take into consideration the new design constraints imposed by the growing use of synthetic fibers.

BRIEF SUMMARY OF THE PRESENT INVENTION

The present invention comprises an integrated cord construction, cord termination, and adjustable clasp. Several embodiments of the cord construction are disclosed. The adjustable clasp has an inlet end, a fastener end, and a center core therebetween. In the preferred embodiment the adjustable clasp has an inlet and a radial port which are connected by a conduit. The inlet end of the adjustable clasp is narrower than the fastener end of the adjustable clasp. A helical groove is provided on the exterior of the adjustable clasp and extends from the radial port to an exterior bore near the fastener end of the adjustable clasp. The exterior bore extends through the solid center core of the adjustable clasp and is substantially perpendicular to the center axis of the adjustable clasp and helical groove.

| | REFERENCE NUMERALS IN THE DRAWINGS | | |
|---|---|---|---|
| 2 | core bundle | 4 | helically wrapped bundle |
| 6 | parallel bundle | 7 | coating |
| 10 | adjustable clasp | 12 | inlet end |
| 14 | inlet | 16 | fastener end |
| 18 | fastener bore | 20 | radial port |
| 22 | exterior | 24 | external helical groove |

-continued

| REFERENCE NUMERALS IN THE DRAWINGS | | | |
|---|---|---|---|
| 26 | exterior bore | 28 | cord |
| 30 | cord end | 32 | radial bend |
| 34 | radial segment | 36 | small radius bend |
| 38 | large radius bend | 40 | terminal bend |
| 42 | terminal segment | 44 | channel cross section |
| 46 | ridges | 48 | fixed anchor |
| 50 | cord end | 52 | wedge |
| 54 | anchor head | 56 | terminal orifice |
| 58 | head inlet | 60 | mesh overlay |

DETAILED DESCRIPTION OF THE INVENTION

Figure 12:
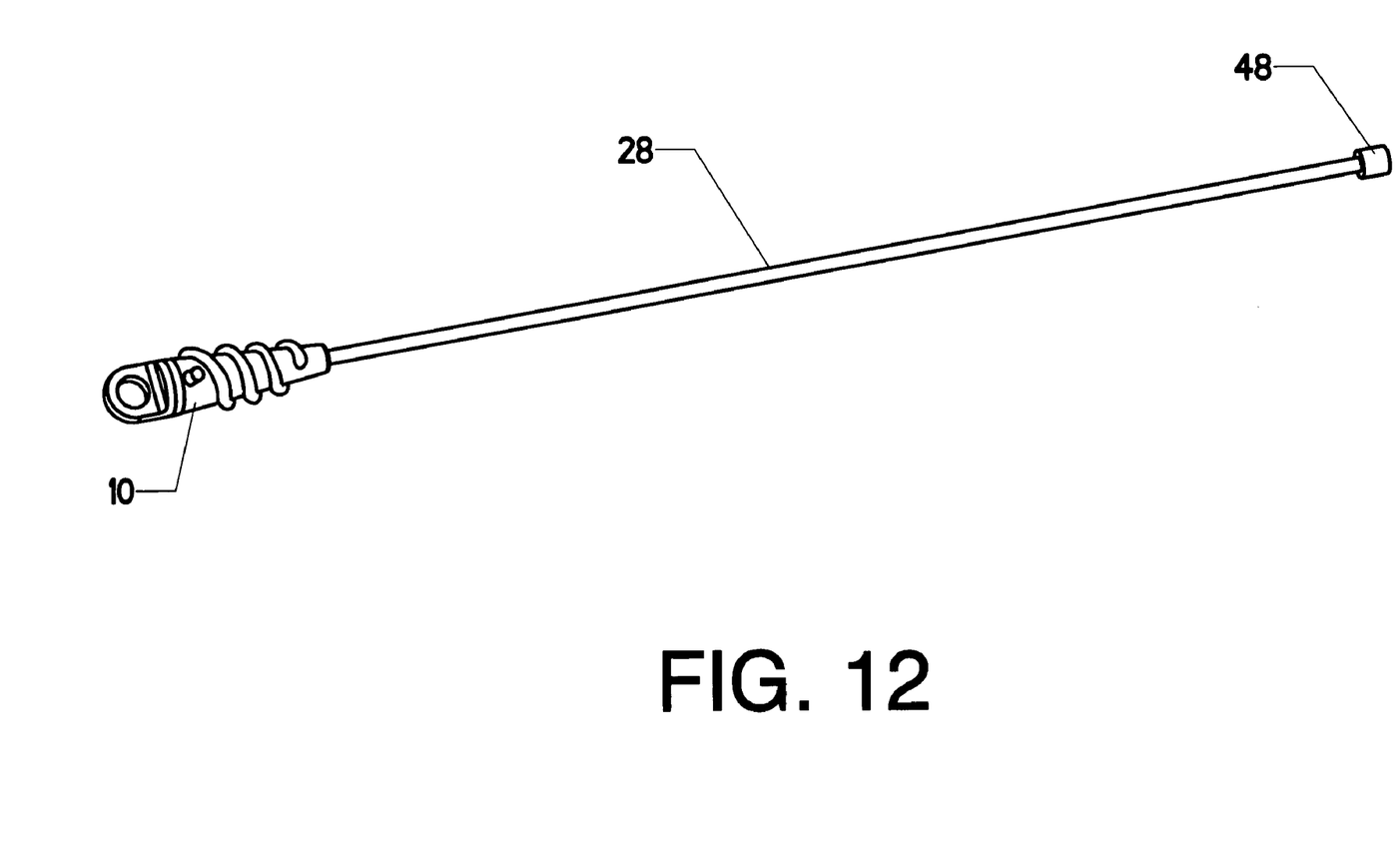
FIG. 12 is a perspective view, showing a complete cord construction, cord termination, and clasp assembly

FIG. 12 shows a completed cable assembly, consisting of adjustable clasp 10, cord 28, and fixed anchor 48. The assembly is configured to transmit a tensile load, such as for a bicycle braking actuator. Fixed anchor 48 is locked into one device (such as the actuating lever of a brake caliper) and clasp 10 is attached to another device (such as the brake handle). The cord then transmits tensile force between these two devices.

Figure 1:
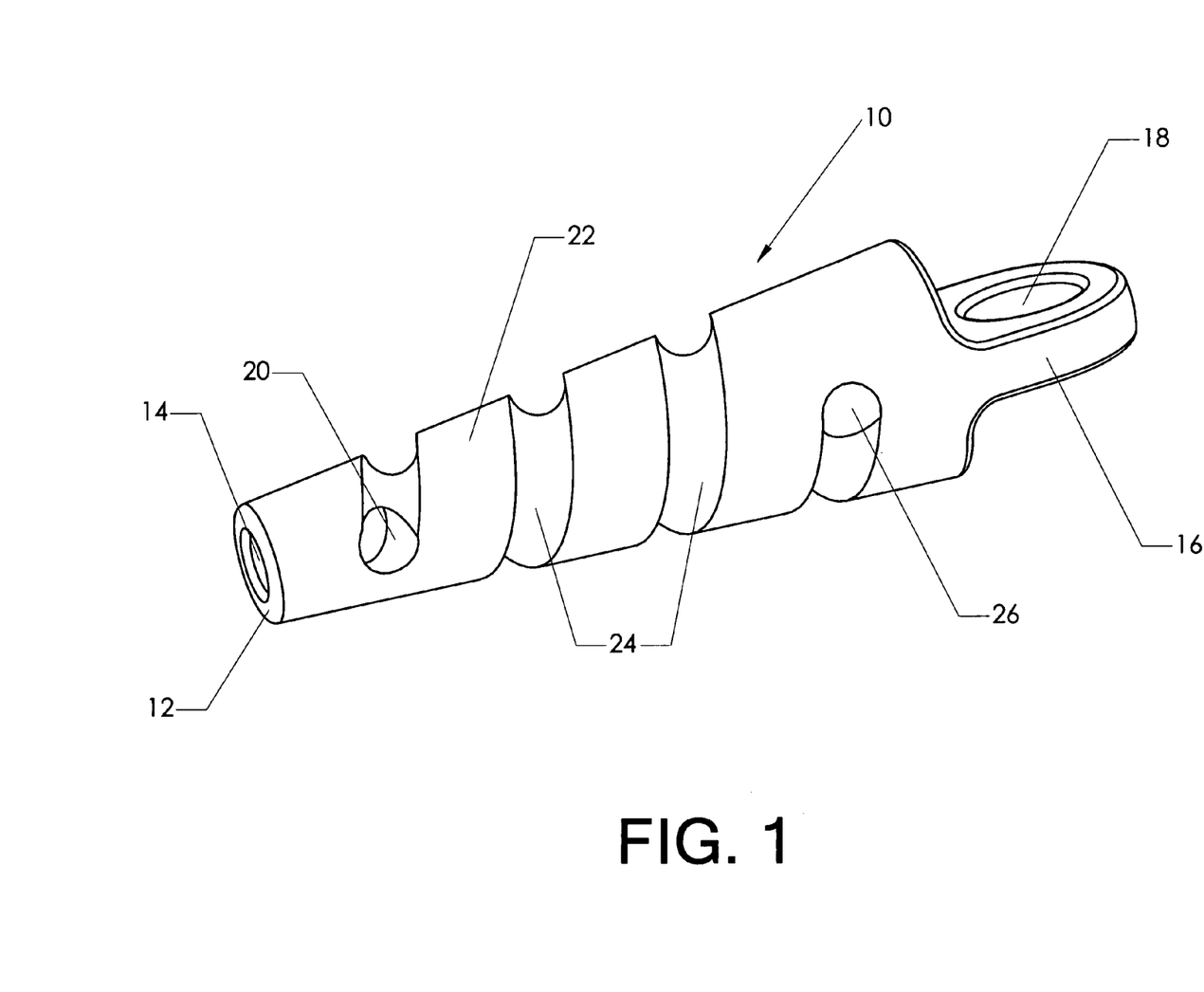
FIG. 1 is a perspective view, showing an adjustable clasp.
Figure 4:
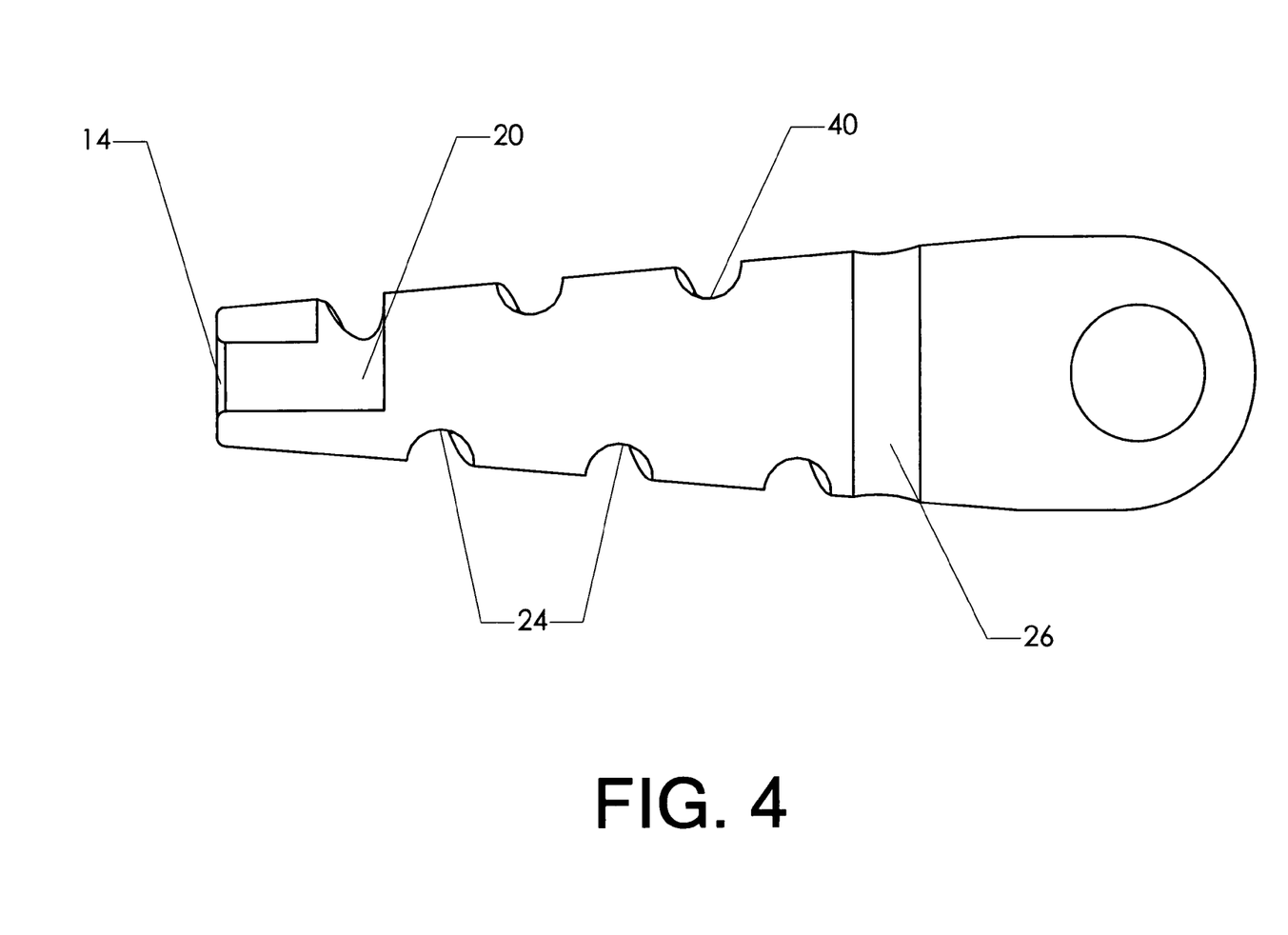
FIG. 4 is a section view, showing an adjustable clasp.

The preferred embodiment of adjustable clasp 10, is illustrated in FIG. 1. Adjustable clasp 10 is generally composed of inlet end 12, fastener end 16, and a tapered clasping section in between. The reader will appreciate that in the preferred embodiment, exterior 22 is substantially conical in shape so that inlet end 12 has a smaller diameter than the end of exterior 22 proximal to fastener end 16. Inlet end 12 has inlet 14 which opens into the solid center core of adjustable clasp 10. Inlet 14 forms a bore into the solid center core and provides a conduit leading to radial port 20 as illustrated in FIG. 4. External helical groove 24 wraps around exterior 22 beginning at radial port 20 and terminating at exterior bore 26.

Fastener end 16 can have any connecting means for fastening adjustable clasp 10 to another device. In the preferred embodiment, fastener bore 18 is provided for connecting adjustable clasp 10 to a bolt or bushing (not shown) on the actuating lever or end actuating device.

Figure 2:
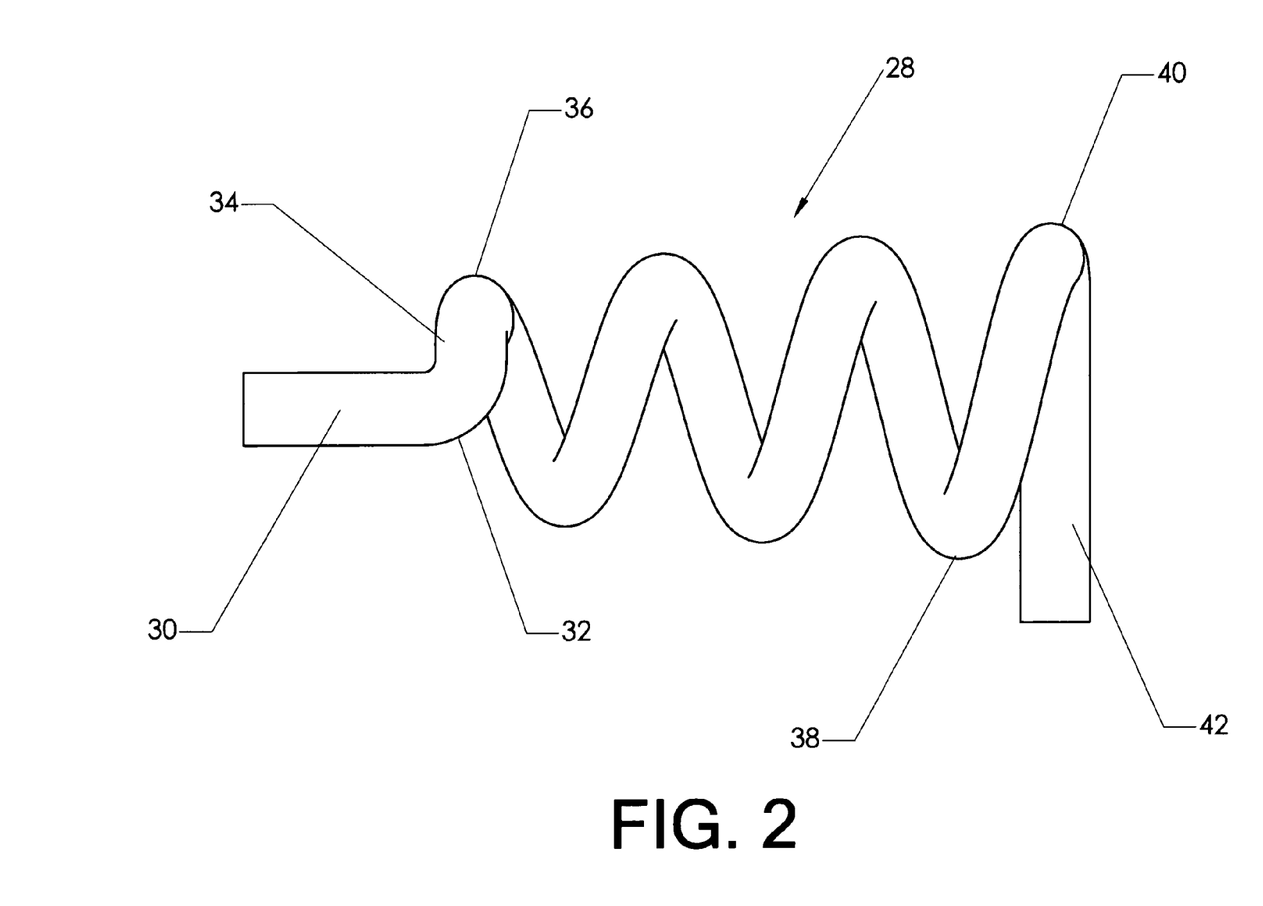
FIG. 2 is a perspective view, showing the end of a cord.

In order to better understand how adjustable clasp 10 works, the end of cord 28 is shown in FIG. 2 as it would appear when threaded around and through adjustable clasp 10. Cord end 30 is typically a straight length of cord, but is shown manipulated in FIG. 2 for illustration purposes only. Cord 28 is attached to adjustable clasp 10 by inserting the cord's end into inlet 14, wrapping it around external helical groove 24 and then inserting it through exterior bore 26.

Once attached to adjustable clasp 10, the cord will assume the geometry shown in FIG. 2. Cord end 30 features radial bend 32 leading to radial segment 34 corresponding to the conduit formed by inlet 14 and radial port 20. Cord end 30 also features terminal bend 40 leading to terminal segment 42 which corresponds with exterior bore 26. In between is a series of bends starting with small radius bend 36 and ending with large radius bend 38 corresponding to the path cord end 30 takes around external helical groove 24. The purpose of the tapered clasping section and the increasingly larger radius bends will be explained subsequently.

Figure 3:
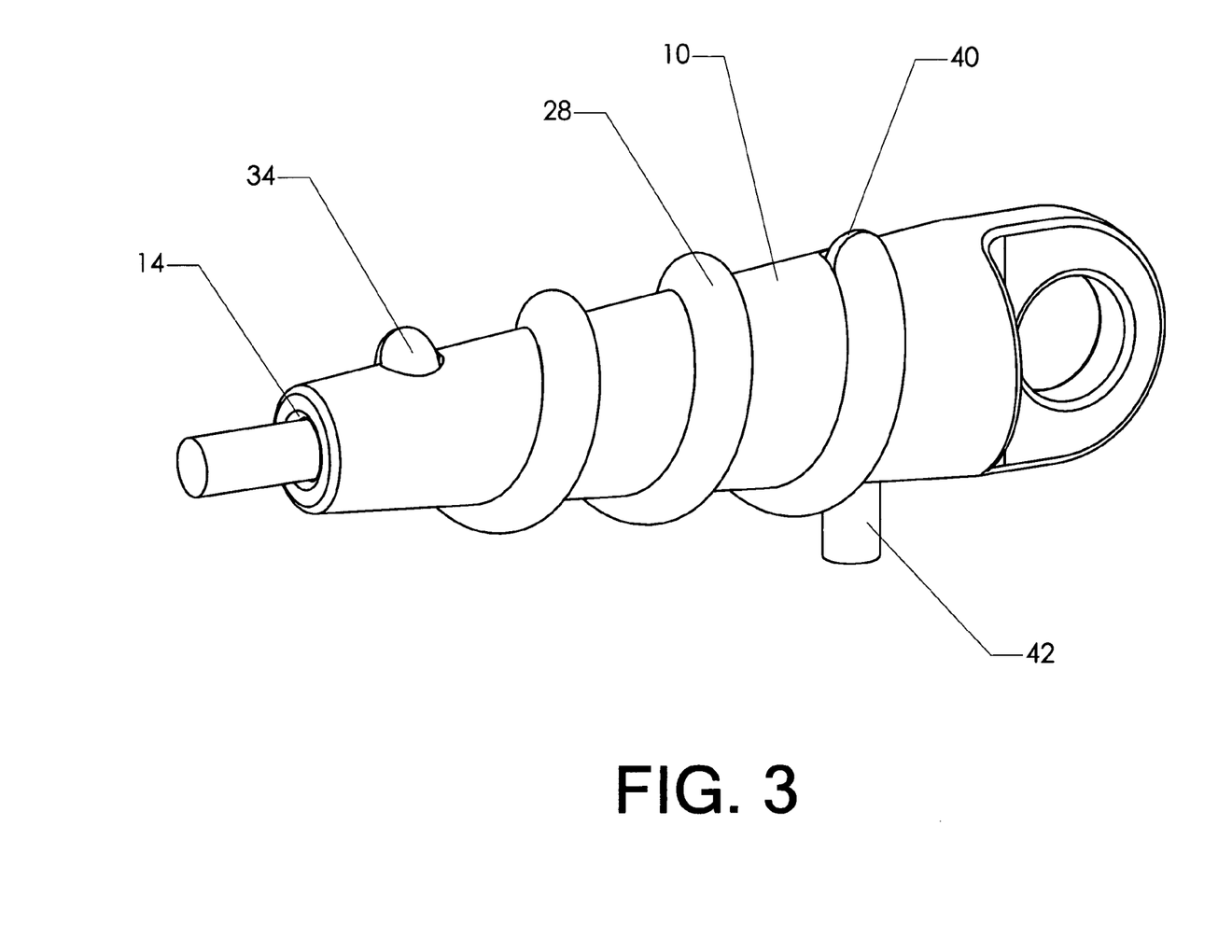
FIG. 3 is a perspective view, showing an adjustable clasp and a cord.

FIG. 3 shows cord 28 secured to adjustable clasp 10. The viewer will note radial segment 34 exits radial port 20 and terminal bend 40 is formed as terminal segment 42 passes through exterior bore 26. The segment of cord between radial segment 34 and terminal bend 40 sits partially recessed within external helical groove 24.

Figure 5:
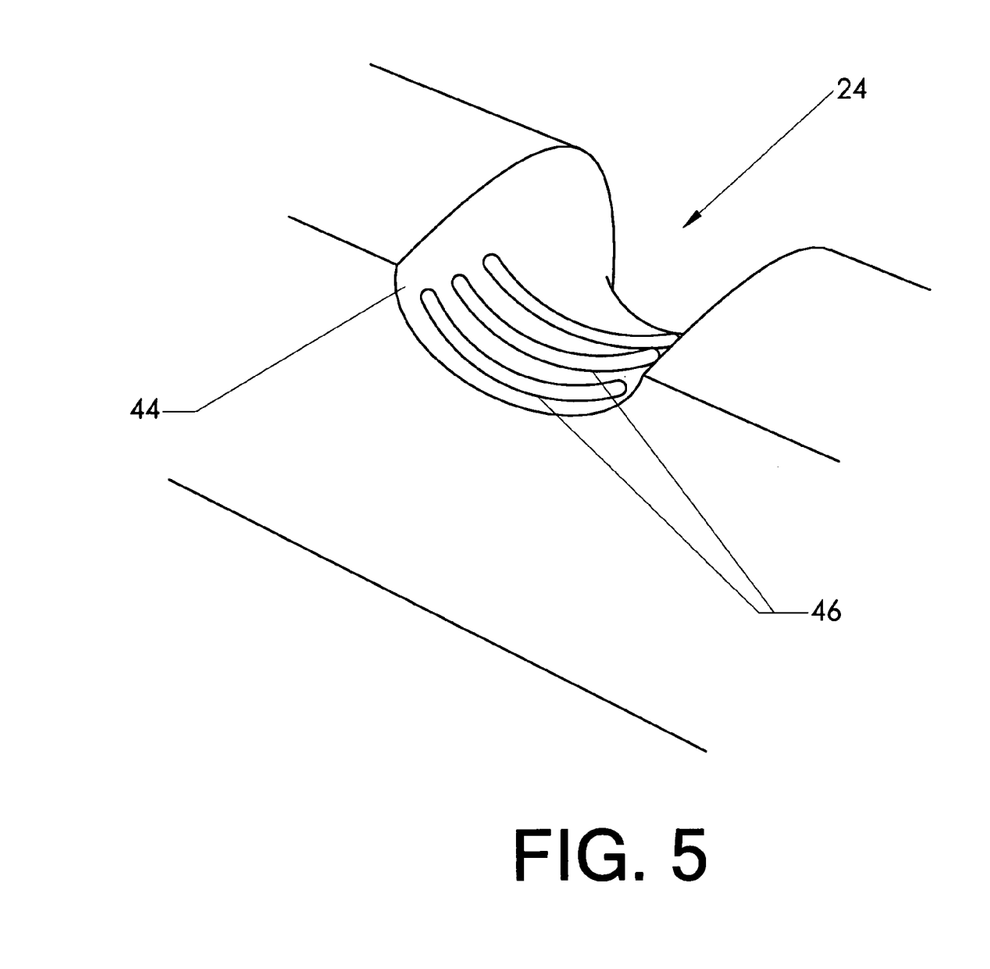
FIG. 5 is a perspective view, showing a portion of the helical groove.

FIG. 4 shows a section view through the center of adjustable clasp 10 to better illustrate its components. The conduit formed by the junction of radial port 20 and inlet 14 is generally in the shape of a ninety-degree elbow and pressure point. Other shapes and bends can similarly be used to create pressure points. FIG. 5 is a detail view of a portion of helical groove 24 (also shown in section). External helical groove 24 creates channel cross-section 44 in the exterior of adjustable clasp 10 along the length of external helical groove 24. Channel cross-section 44 is generally rounded to promote intimate contact with cord 28 when cord 28 is attached to adjustable clasp 10. The reader will appreciate that the shape of external helical groove 24 influences the total area of contact between cord 28 and adjustable clasp 10. It is generally desirable to maximize the area of contact in order to maximize the frictional engagement as will be explained subsequently. Exterior bore 26 crosses from one point on the exterior to a point on the opposite side of the exterior.

Returning to FIG. 3, those that are skilled in the art will appreciate that when a tensile load is applied to cord 28, cord 28 will squeeze into external helical groove 24, increasing the normal load between external helical groove 24 and cord 28. This increase in normal loading helps prevent cord 28 from becoming unintentionally detached from adjustable clasp 10. External helical groove 24 extends around the exterior 22 of adjustable clasp 10 about a central axis. In the preferred embodiment, the distance between external helical groove 24 and the central axis gradually increases as external helical groove 24 approaches fastener end 16. This feature allows for the smooth transfer of frictional grip along cord 28 when cord 28 is subjected to a tensile load (rather than having most of the frictional engagement concentrated near inlet end 12). The conical shape of the exterior surface means that the helix running down the center of helical groove 24 has a varying radius.

The combination of the conduit between inlet 14 and radial port 20 and exterior bore 26 keeps cord 28 situated within external helical groove 24 when cord 28 is subjected to compression loading or when the tensile load is removed. These features help prevent cord-28 from becoming unintentionally detached from adjustable clasp 10 as cord 28 experiences cyclic push-pull motion from the control device.

External helical groove 24 can be modified with gripping features to provide enhanced grip of cord 28. Ridges 46 are one example of a gripping feature that can be used. This modification is illustrated in FIG. 5. In this embodiment, ridges 46 protrude along external helical groove 24. These ridges push into the outer layer of cord 28 without penetrating the protective coating as cord 28 is subjected to tensile loading. Other textural variations can be provided along external helical groove 24 for enhanced gripping including bumps, cuts, ribs, and adhesives.

Figure 6:
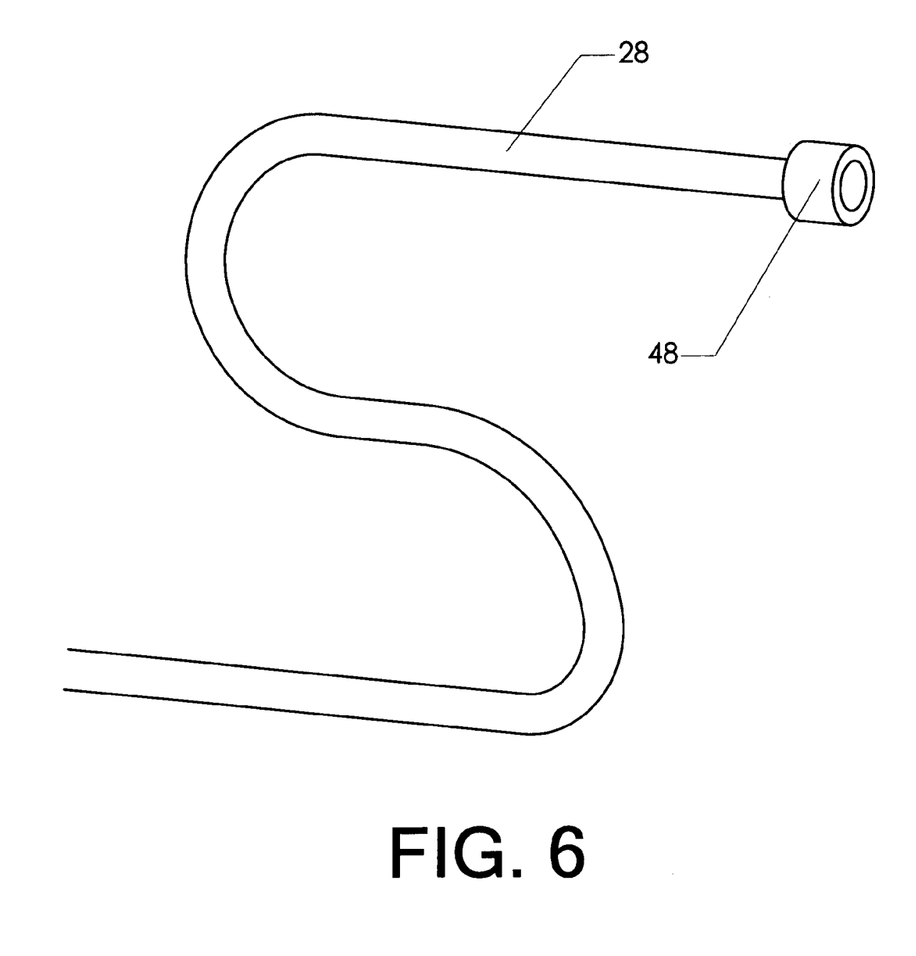
FIG. 6 is a perspective view, showing a cord with a fixed anchor.
Figure 7:
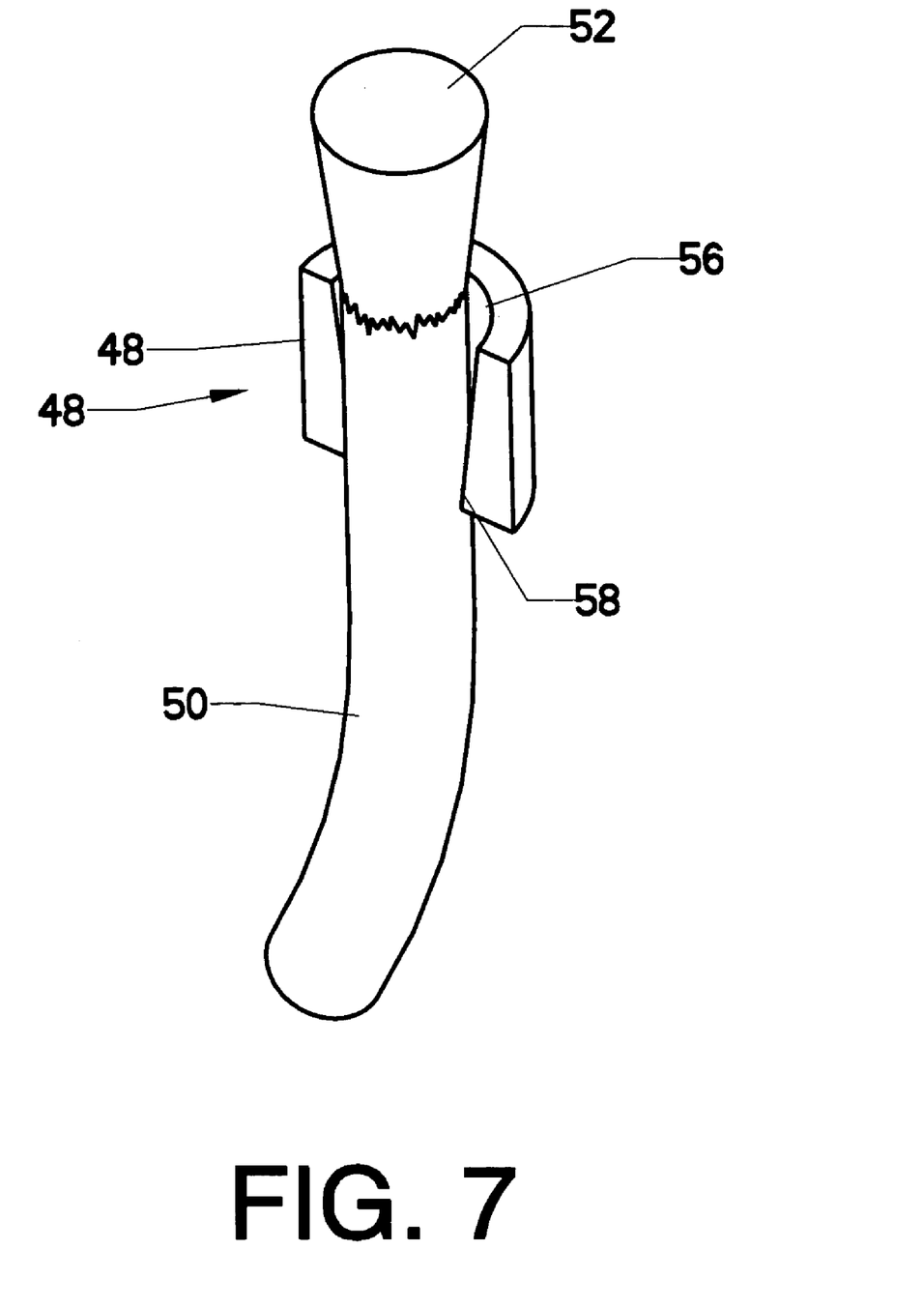
FIG. 7 is a partial perspective view, showing a fixed anchor installed on a cable.

It is generally unnecessary to have adjustable clasp 10 on both ends of cord 28. In most applications, a simple fixed anchor is all that is required for the other end of the cord. FIGS. 6 and 7 show a fixed anchor that can be used with synthetic fibers. As illustrated in FIG. 6 fixed anchor 48 attaches to the end of cord 28. Fixed anchor 48 can be provided in many shapes and can have various features to enable attachment to the desired device.

FIG. 7 shows a preferred embodiment of fixed anchor 48. Fixed anchor 48 is generally formed by attaching anchor head 54 to cord end 50. The anchor head has been section in half in this view to reveal an internal tapered passage. Chord end 50 is splayed and potted into a conical wedge 52. Wedge 52 can be created by fanning out the fibers of cord end 50 and applying a liquid potting compound (such as an epoxy) to the fibers. The viewer will appreciate that the resulting wedge 52 has a larger diameter than cord end 50. Anchor head 54 has terminal orifice 56 which is large enough for receiving wedge 52 and head inlet 58 which is large enough for receiving cord 28 but too small for wedge 52 to pass through. Accordingly, when cord 28 is pulled, wedge 52 is received in anchor head 54 but cannot be pulled all the way through. There are many other ways to affix an anchor to a cord, with the version shown in FIG. 7 being only one example among many possibilities. The reader should note that the adjustable clasp need not be a separate component attached to a device to be actuated. Instead, the clasp can be formed integrally with the device itself.

Returning then to FIG. 12, the reader will appreciate that the completed assembly includes the cord, a fixed anchor, and the adjustable clasp. The overall length of the assembly can be easily adjusted by moving the position of the adjustable clasp with respect to the cord.

Although cord 28 can be composed of any material that is appropriate for the application, the preferred material for control cord applications, such as bicycle braking and shifting applications, is a high performing, synthetic "super fiber." Such a synthetic fiber can be designed with a low flexural modulus and high tensile strength in order to lower the force required to actuate cord 28 (relative to traditional steel cables). Examples of synthetic fibers which can be used for such an application include, "Poly"(p-phenylene-2,6-benzobisoxazole), liquid crystal aromatic polyester fibers, high modulus polyethylene, and aramid compounds.

As mentioned previously, bicycle control cords are typically composed of an inner steel cable that is wrapped in a protective and supportive outer sheath or housing. The aforementioned synthetic fibers can be used in place of the inner steel cable. The synthetic fibers can be arranged where strands of fibers are aligned parallel to each other. They can either be longitudinally straight or with a slight twist (less than one full twist per inch). Providing a slight twisting is preferred as twisting allows the fibers to grip one another and share their loads with adjoining fibers. A well-balanced twist improves performance by distributing the tensile and compressive loads evenly across the bundle of fibers especially around bends, thus producing a stiffer and more responsive cord.

Figure 8:
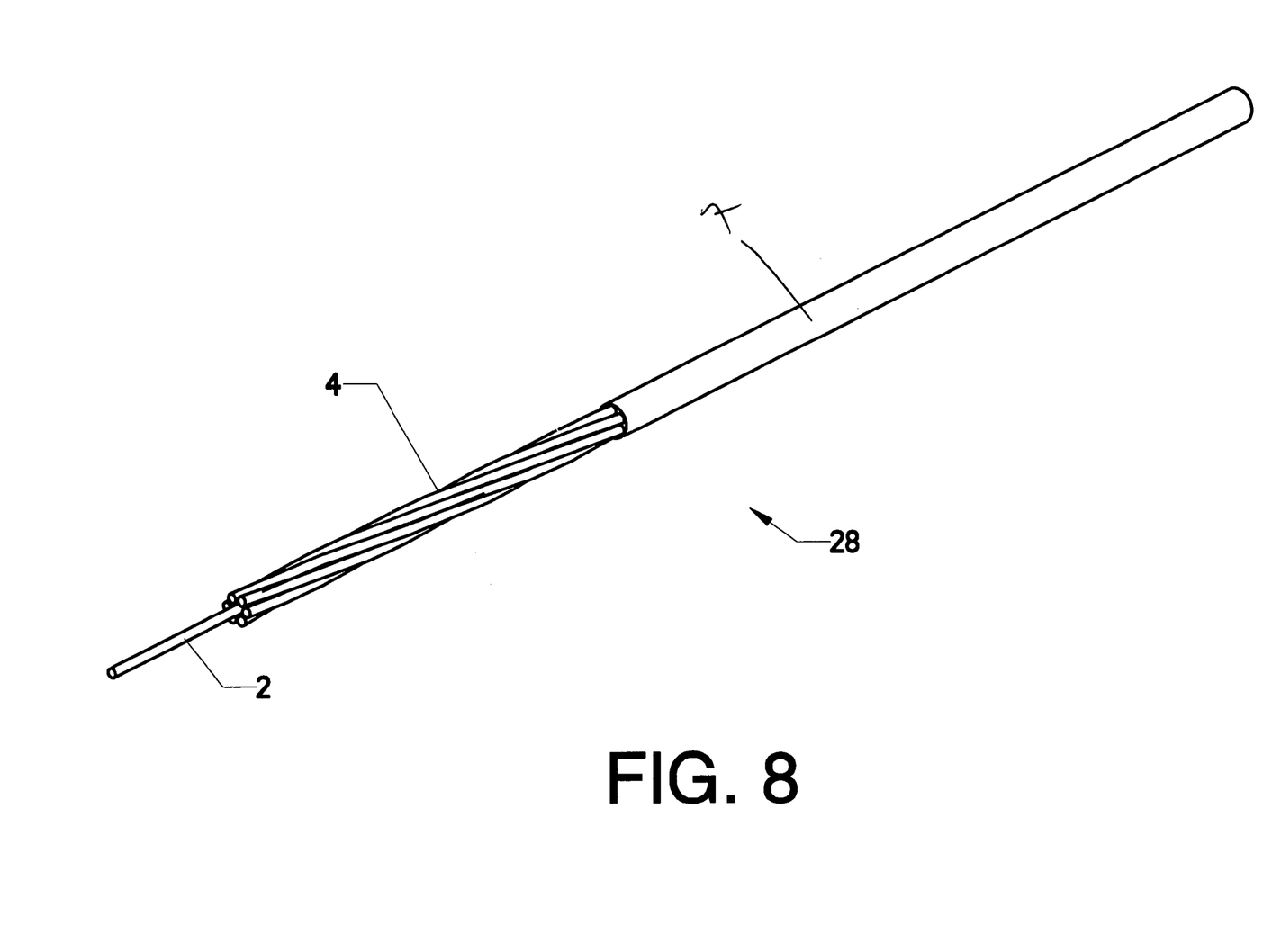
FIG. 8 is a perspective view, showing a cord construction.
Figure 9:
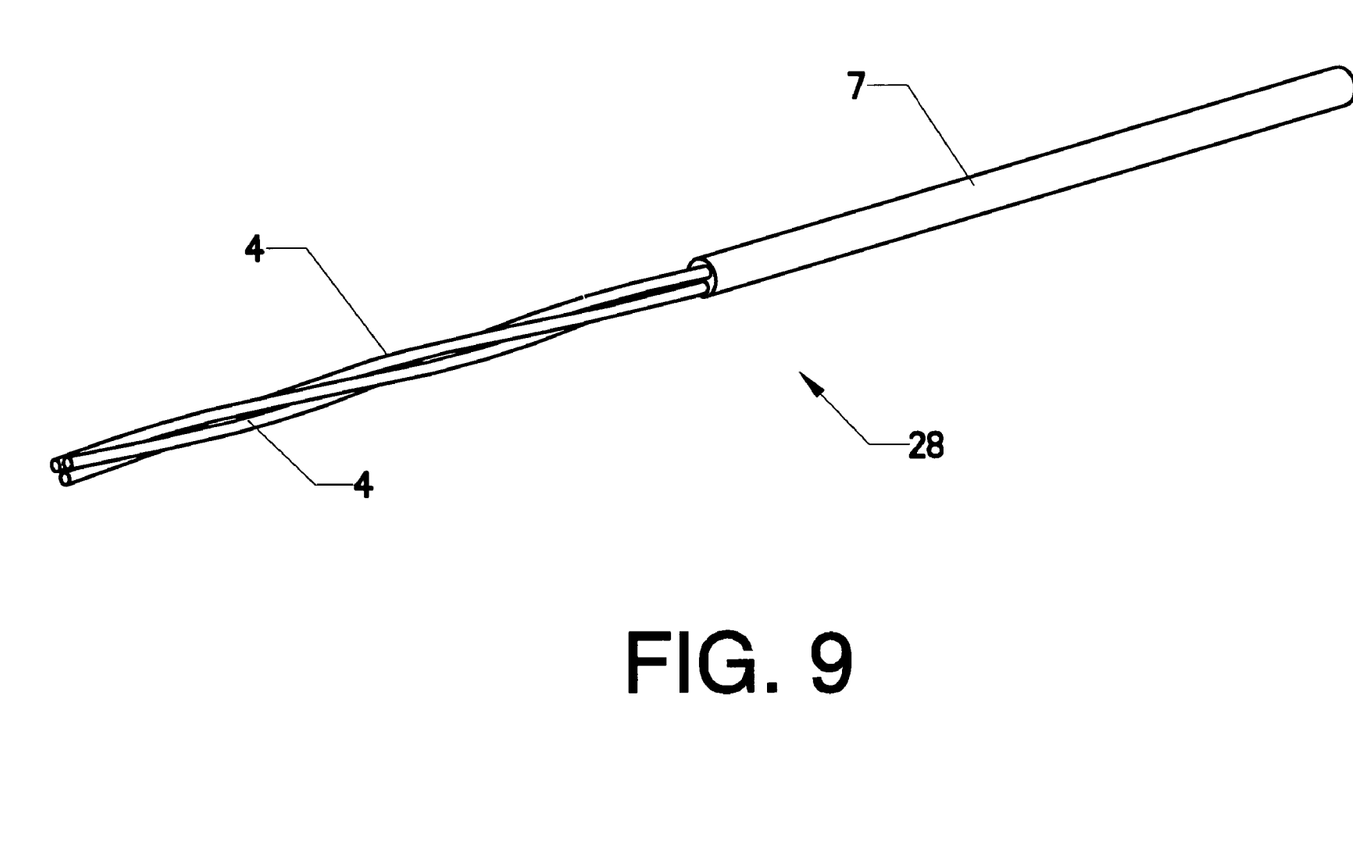
FIG. 9 is a perspective view, showing a cord construction.
Figure 10:
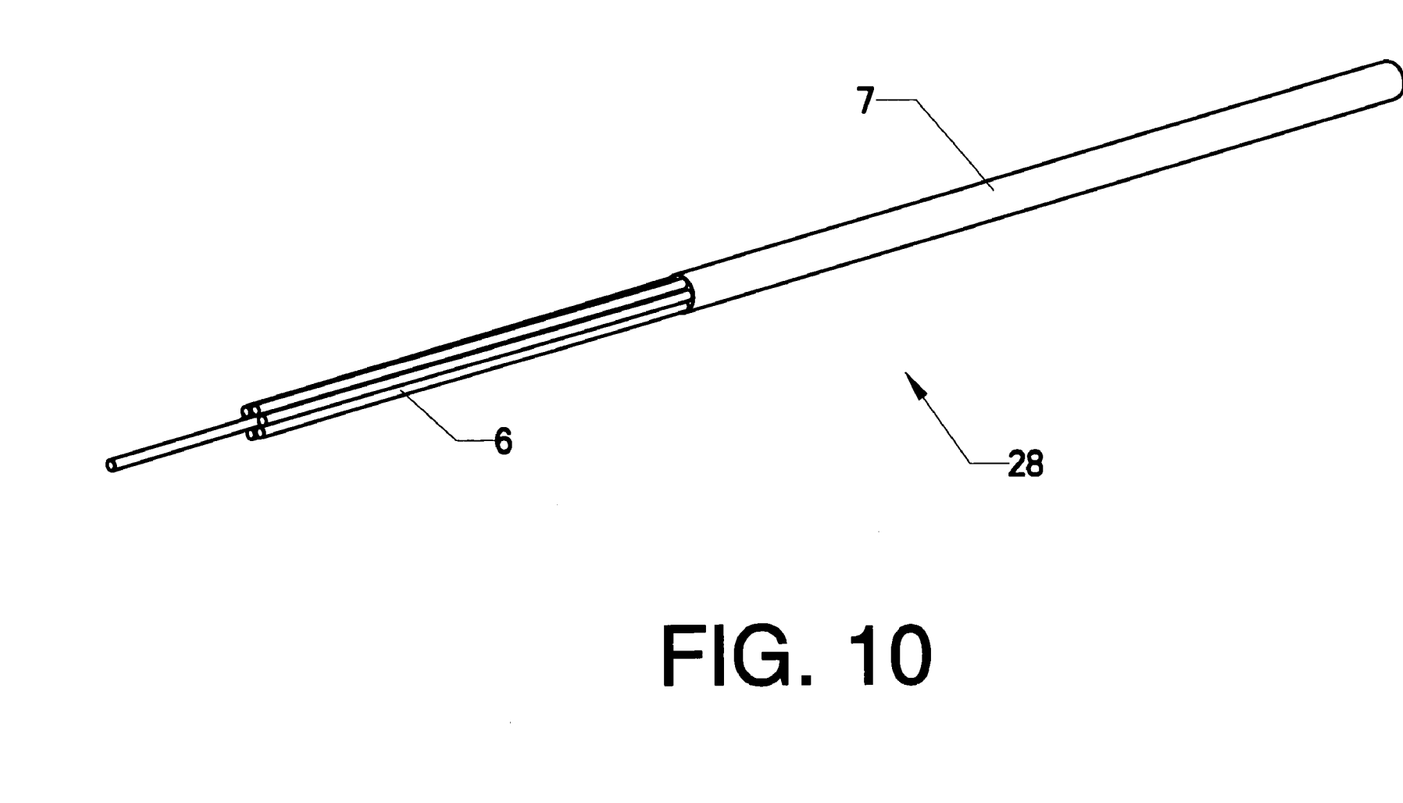
FIG. 10 is a perspective view, showing a cord construction.

Many different cable constructions are possible. FIG. 8 shows an embodiment having a core bundle 2 of synthetic fibers, surrounded by several helically wrapped bundles 4. The entire assembly is then encased in an encompassing coating 7. FIG. 9 shows an embodiment omitting the core bundle. It includes a series of helically wrapped bundles 4, again encompassed by coating 7. FIG. 10 shows a cable formed by a set of parallel bundles 6. These are again maintained in position by coating 7.

Those that are skilled in the art know that a bundle of synthetic fibers will not maintain its cross-sectional shape when subjected to a compressive normal load. In fact a bundle of synthetic fibers with a normally circular cross-section is very easily squeezed into a flat ribbon when pinched between one's fingers. The same phenomenon occurs when the bundle is wrapped around a bend (such as a pulley); the bundle will have a tendency to flatten out. One technique that can be used to prevent this sort of cross-sectional deformation is to provide an outer weave of fibers around the inside tensile-load bearing bundle. Another option is to use an outer "jacket" or protective coating as will be described subsequently. Using a combination of an outer weave of fibers and an outer jacket or protective coating is preferred.

A "jacket" can be a thin sprayed coating, a thicker extruded coating, or other type of overlying layer. Fluoroplastic polymers, such as polytetrafluoroethylene, and polyamide, are examples of materials that can be used for protective jackets. As mentioned previously, employing a jacket around the bundle of fibers can prevent cross-sectional deformation of the cord. Use of a jacket can also provide the additional benefit of reduced friction. Other additives can be incorporated into the outer jacket, such as graphite, to further reduce the outer jacket's coefficient of friction. Accordingly, cords with these protective jackets may not require additional lubricants which attract dust and other friction-creating contaminants.

Figure 11:
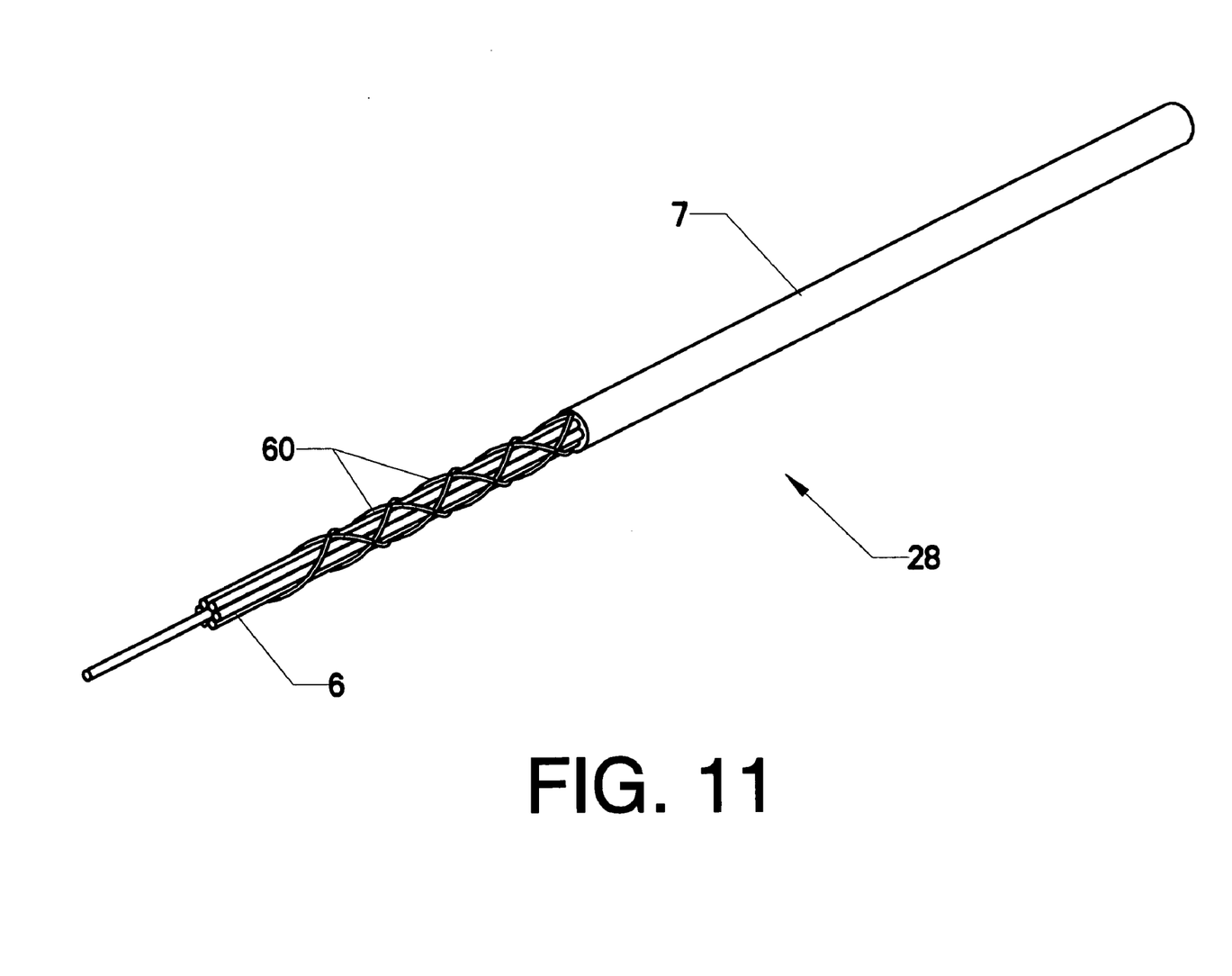
FIG. 11 is a perspective view, showing a cord construction.

The best combination is to wrap the load carrying fibers with an overlying mesh, and then encasing the entire assembly with a protective coating. FIG. 11 shows this embodiment. The inner bundles of synthetic fibers are reinforced by overlying mesh 60. Coating 7 is then placed over the entire assembly, locking the internal components in position.

Other additives can similarly be provided to the bundle of fibers or the outer jacket to prevent deterioration of the fibers from prolonged exposure to sunlight and other substances. For example, blends of hindered phenolic antioxicant and phosphates, such as Irganox B1171, are useful for stabilizing the polyamides and other polymers. Also ultraviolet light absorber (UVA) additives, such as 2—2(2H-benzotriazol-2-yl)-4,6-bis(1-methyl-1-phenylethyl)phenol [Tinuvin 234], can be employed to absorb ultraviolet light. These UVAs can be mixed in the pigment and then into the outer jacket or protective coating material. In addition, a hindering amine light stabilizer (HALS) such as Poly[[6-[(1,1,3,3-tetramethylbutyl)amino]-1,3,5-triazine-2,4-diyl][2,2,6,6-tetramethyl-4-piperdinyl)imino]-1,6-hexanediyl[2,2,6,6-tetramethyl-4-piperidinyl)imino]]] can be used to provide enhanced light stability and thermal stabilization for the protective coating.

Pigment additives (such as white pigments, black pigments, green pigments, yellow pigments, blue pigments, and red pigments) can also be used to provide more opacity to the jacket or protective coating. White pigments containing titanium dioxide compounds and black pigments are particularly effective. These pigment additives absorb much of the ultraviolet light energy and reduces the fibers exposure to electromagnetic radiation. The pigment additives also contain minerals and elements which provide natural lubrication to reduce the coefficient of friction of the protective coating so that it slides more easily within the outer sheath or housing. These pigments can also be mixed as appropriate to achieve a desired color.

Although the preceding descriptions contain significant detail they should not be viewed as limiting the invention but rather as providing examples of the preferred embodiments of the invention. For example, the cord termination and clasp can be used in other applications besides bicycle control cords. The control cords can also be used in other vehicular applications. The invention can be employed to control throttles, clutches, kill switches, and brakes. The invention can also be used in industrial applications to control movement of valves, taps, regulators or similar devices for controlling movement of fluids through pipes.

One other application is in the field of robotics. The invention can be used as part of push-pull control cords which control movements of levers, buttons, knobs, switches, rods, keys, spools, reels, bobbins, or similar devices. The control cord could also be used to control movement of parts of the robot's main body or extremities. These applications do not depart from the spirit and scope of the invention. Accordingly, the scope of the invention should be determined by the following claims, rather than the examples given.

Having described my invention, I claim:

1. An adjustable clasping mechanism for attaching a cord to a device comprising:
   a. an adjustable clasp, having an inlet end, a fastener end, a center core, and an exterior around said center core between said inlet end and said fastener end;
   b. an inlet, proximate said inlet end of said adjustable clasp, said inlet opening into a bore, said bore providing a conduit between said inlet and a radial port, said radial port opening to said exterior of said adjustable clasp;
   c. a helical groove, said helical groove intersecting said radial port and extending around said exterior of said adjustable clasp;
   d. a cord, said cord having a first end and a second end, said first end of said cord attached to said adjustable clasp, wherein said cord passes through said conduit and along said helical groove, wherein said second end of said cord comprises a wedge; and
   e. a fixed anchor having a terminal orifice large enough to receive said wedge and a head inlet which is small enough to prevent said wedge from passing therethrough.

2. The adjustable clasping mechanism of claim 1, further comprising an exterior bore, said exterior bore intersecting said helical groove and opening from said exterior into said center core and passing completely therethrough.

3. The adjustable clasping mechanism of claim 1, further comprising a fastening means for attaching said cord to said device, said fastening means proximal to said fastener end of said adjustable clasp.

4. The adjustable clasping mechanism of claim 2, further comprising a fastening means for attaching said cord to said device, said fastening means proximal to said fastener end of said adjustable clasp.

5. The adjustable clasping mechanism of claim 1, said adjustable clasp further comprising an exterior bore intersecting said helical groove and opening from said exterior into said center core and passing completely therethrough, wherein said cord also passes through said exterior bore.

6. The adjustable clasping mechanism of claim 1, wherein said adjustable clasp is tapered so that said inlet end is narrower than said fastener end.

7. An adjustable clasping mechanism for attaching a cord to a device comprising:
   a. an adjustable clasp, having an inlet end, a fastener end, a center core, and an exterior around said center core between said inlet end and said fastener end;
   b. an exterior bore, said exterior bore opening from said exterior into said center core and passing completely therethrough;
   c. a helical groove, said helical groove beginning at said exterior bore and extending around said exterior of said adjustable clasp about a central axis, said helical groove extending along a length of said exterior;
   d. wherein said exterior bore passes through said center core substantially perpendicular to said central axis; and
   e. wherein said exterior of said adjustable clasp is tapered along said length of said exterior along which said helical groove extends.

8. The adjustable clasping mechanism of claim 7, further comprising an inlet, proximate said inlet end of said adjustable clasp, said inlet opening into a bore, said bore providing a conduit between said inlet and a radial port, said radial port opening to said exterior of said adjustable clasp.

9. The adjustable clasping mechanism of claim 8, further comprising a fastening means for attaching said cord to said device, said fastening means proximal to said fastener end of said adjustable clasp.

10. The adjustable clasping mechanism of claim 7, further comprising a fastening means for attaching said cord to said device, said fastening means proximal to said fastener end of said adjustable clasp.

11. The adjustable clasping mechanism of claim 7, further comprising a cord, said cord having a first end and a second end, said first end of said cord attached to said adjustable clasp, wherein said cord passes through said exterior bore and along said helical groove.

12. The adjustable clasping mechanism of claim 11, further comprising an inlet, proximate said inlet end of said adjustable clasp, said inlet opening into a bore, said bore providing a conduit between said inlet and a radial port, said radial port opening to said exterior of said adjustable clasp, wherein said cord also passes through said conduit between said inlet and said radial port.

13. The adjustable clasping mechanism of claim 11, wherein said second end of said cord is attached to a fixed anchor.

14. An adjustable clasping mechanism for attaching a cord to a device comprising:
   a. an adjustable clasp, having a first end, a second end, a center core, and an exterior around said center core between said first end and said second end, said adjustable clasp further having
      i. a first bore passing through said center core;
      ii. a second bore passing through said center core;
   b. a cord, said cord having a first end and a second end, said first end of said cord attached to said adjustable clasp such that said cord passes through said first bore, wraps around a portion of said exterior, and passes through said second bore; wherein said second end of said cord comprises a wedge; and
   c. a fixed anchor having a terminal orifice large enough to receive said wedge and a head inlet which is small enough to prevent said wedge from passing therethrough.

* * * * *